United States Patent
Slavin et al.

(10) Patent No.: US 12,147,923 B2
(45) Date of Patent: Nov. 19, 2024

(54) SYSTEM AND METHOD FOR IMPLEMENTING A HOME LENDING DATA RESERVOIR

(71) Applicant: JPMorgan Chase Bank, N.A., New York, NY (US)

(72) Inventors: Ilya Slavin, Brooklyn, NY (US); Edward Bowlby, Allen, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 206 days.

(21) Appl. No.: 17/647,948

(22) Filed: Jan. 13, 2022

(65) Prior Publication Data

US 2023/0222416 A1 Jul. 13, 2023

(51) Int. Cl.
*G06Q 10/0631* (2023.01)
*G06F 16/25* (2019.01)

(52) U.S. Cl.
CPC ..... *G06Q 10/06316* (2013.01); *G06F 16/254* (2019.01)

(58) Field of Classification Search
CPC .......................... G06Q 10/06316; G06F 16/254
See application file for complete search history.

(56) References Cited

U.S. PATENT DOCUMENTS

| | | | |
|---|---|---|---|
| 7,676,390 B2* | 3/2010 | Senturk | G06Q 10/10 705/7.29 |
| 8,417,715 B1* | 4/2013 | Bruckhaus | G06Q 10/04 705/26.1 |
| 9,805,338 B1* | 10/2017 | Ghosn | G06Q 30/08 |
| 10,157,347 B1* | 12/2018 | Kasturi | G06F 16/3326 |
| 10,977,430 B1* | 4/2021 | Horesh | G06F 40/151 |
| 2013/0173337 A1* | 7/2013 | Evans | G06Q 30/0201 705/7.29 |
| 2017/0091859 A1* | 3/2017 | Mohammad | G06F 16/2365 |
| 2018/0218069 A1* | 8/2018 | Rege | G06F 16/24573 |
| 2020/0372398 A1* | 11/2020 | Shaikh | G06N 20/10 |
| 2021/0150129 A1* | 5/2021 | Horesh | G06F 40/103 |
| 2021/0150623 A1* | 5/2021 | Rostami | G06V 40/20 |
| 2021/0350456 A1* | 11/2021 | Tarmann | G06Q 40/03 |

(Continued)

OTHER PUBLICATIONS

Mathur et al., Optimizing OLAP Cube for Supporting Business Intelligence and Forecasting in Banking Sector, Journal of Information Technology Management 13.1 (2021): 81-99. (Year: 2021).*

(Continued)

*Primary Examiner* — Andre D Boyce
(74) *Attorney, Agent, or Firm* — Greenblum & Bernstein, P.L.C.

(57) ABSTRACT

An embodiment of the present invention is directed to enabling real-time data processing to analytical applications that use a real-time cache to drive business decisions. An embodiment of the present invention is directed to limiting data transformation (e.g., transforming data only once) and making it available for multiple consumers and stores. For example, an embodiment of the present invention is directed to an elastic extract transform load (ETL) extension to a strategic data transformation pipeline to support uniform content distribution to various stores as well as reactive processing. Data transformations may be treated as ETL, ensuring operational and analytical stores see and act on the same data.

20 Claims, 7 Drawing Sheets

(56) References Cited

U.S. PATENT DOCUMENTS

| | | | | |
|---|---|---|---|---|
| 2022/0198054 A1* | 6/2022 | Picos | ................. | G06F 21/6245 |
| 2022/0198432 A1* | 6/2022 | Jones | ..................... | G06Q 20/12 |
| 2022/0382713 A1* | 12/2022 | Sadiq | ................. | G06F 16/2471 |
| 2022/0383301 A1* | 12/2022 | Jones | ..................... | G06Q 20/14 |
| 2022/0383313 A1* | 12/2022 | Jones | ................... | G06F 16/955 |
| 2023/0055605 A1* | 2/2023 | Jones | ................. | G06Q 20/203 |

OTHER PUBLICATIONS

Alrehamy, Hassan. Extensible metadata management framework for personal data lake. Diss. Cardiff University, 2018. (Year: 2018).*

* cited by examiner

○ Main     ○ Analysis     ○ Mortgage Sensitivity

Savings Screener

/monthly_savings>1000 and/lifetime_savings>50000    [Filter]

Oof.top_nm20,skip_nm0,conflation...    [Options]

| Loan_id ↑ | Current APR | Current Lifetime Expense | Current Monthly Pymt | Current Balance | Forecasted Balance | New APR | New APR ID | New Lifetime Expense | New Monthly Pymt | Monthly Savings | Lifetime Savings |
|---|---|---|---|---|---|---|---|---|---|---|---|
| L00084... | 4.78 | $879,355.41 | $5,495.97 | $649,26... | $615,921.65 | 3.0085 | A000... | $807,547.85 | $4,486.38 | $1,009.59 | $71,807.56 |
| L00099... | 4.78 | $879,247.76 | $5,495.30 | $649,.... | $615,842.93 | 3.0085 | A000... | $807,435.20 | $4,485.75 | $1,009.45 | $71,797.55 |
| L00030... | 4.78 | $879,232.74 | $5,495.20 | $649,26... | $615,831.95 | 3.0085 | A000... | $807,435.20 | $4,485.75 | $1,009.45 | $71,797.55 |
| L00031... | 4.78 | $879,085.01 | $5,494.28 | $649,26... | $615,723.91 | 3.0085 | A000... | $807,299.53 | $4,485.00 | $1,009.28 | $71,885.48 |
| L00096... | 4.78 | $878,976.464 | $5,493.60 | $648,98... | $615,644.52 | 3.0085 | A000... | $807,199.84 | $4,484.44 | $1,009.16 | $71,776.62 |
| L00058... | 4.78 | $878,898.36 | $5,493.11 | $648,05... | $615,587.41 | 3.0085 | A000... | $807,128.72 | $4,484.05 | $1,009.07 | $71,770.24 |

Connected

Customer Information

| Loan ID ↑ | First Name | Last Name | Remaining_periods | Term | Balance |
|---|---|---|---|---|---|
| L00084xxx | E. | Doe | 160 | 360 | $649,267.51 |

Figure 7

SYSTEM AND METHOD FOR IMPLEMENTING A HOME LENDING DATA RESERVOIR

FIELD OF THE INVENTION

The invention relates generally to a system and method for providing a home lending data reservoir architecture that enables near real-time machine learning and/or artificial intelligence and data analytics.

BACKGROUND OF THE INVENTION

The current home lending architecture involves complex dependencies between data transformation and end user consumption that are driving data costs. Generally, there are hundreds and hundreds of sources of data in home lending which generate specialized data sets. Most systems still depend on legacy technologies which require data movement from system to system. This leads to a tremendous effort in data management which require significant resources, time and effort.

These and other drawbacks exist.

SUMMARY OF THE INVENTION

According to an embodiment, the invention relates to a system that implements a home lending data reservoir system. The system comprises: a multi-topic low latency message broker that receives normalized data records from a plurality of systems of record (SORs); a common semantic extract transform load (ETL) module that transforms data from the normalized data records and makes the data suitable for use and reporting in near real-time; a first queue subscriber that communicates with a business system for machine learning and artificial intelligence models and one or more decision support systems; a second queue subscriber that communicates with an operational store wherein the operational store provides data within a predetermined period of time; and a third queue subscriber that communicates with a data lake through a data pipeline wherein the data lake provides data older than the predetermined period of time. An embodiment of the present invention may support a multitude of destinations based on interest and permissions.

According to another embodiment, the invention relates to a method that implements a home lending data reservoir. The method comprises the steps of: receiving, via a multi-topic low latency message broker, normalized data records from a plurality of systems of record (SORs); transforming, via a common semantic extract transform load (ETL) module, data from the normalized data records and makes the data suitable for use and reporting in near real-time; communicating, via a first queue subscriber, with a business system for machine learning and artificial intelligence models and one or more decision support systems; communicating, via a second queue subscriber, with an operational store wherein the operational store provides data within a predetermined period of time; and communicating, via a third queue subscriber, with a data lake through a data pipeline wherein the data lake provides data older than the predetermined period of time.

The system and method may utilize a specially programmed computer system comprising one or more computer processors, interactive interfaces, electronic storage devices, and networks. The computer implemented system, method and medium described herein provide unique benefits and advantages to entities, organizations and other users, according to various embodiments of the invention. An embodiment of the present invention is directed to enabling machine learning and/or artificial intelligence and data analytics as close to real-time as possible. The innovative system rationalizes the way home lending (HL) systems process Systems of Record (SORs). New data sources may integrate with various data models. Some of these data sources may have higher velocity and volume of change than expected. An embodiment of the present invention is directed to reducing long term costs by moving from legacy data stores to modern cloud-friendly platforms.

A publish-subscribe (Pub/Sub) model is typically not used in the banking businesses, which are highly regulated with extremely complex workflows and thus are geared toward use of a traditional data stores, such as databases and mainframes, as opposed to query technologies. Moving to a messaging model facilitates creation of real-time products and service automation that does not exist in current markets across the industry.

An embodiment of the present invention is directed to moving data flow to a message bus-based architecture, thereby reducing the number of times content is transformed. Data stores may be utilized based on their capabilities, rather than adjusting business capabilities to match the stores used. With an embodiment of the present invention, real-time data caches may be adopted for on-the-fly analytics to solve business problems.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to limiting data transformation (e.g., transforming data only once) and making it available for multiple consumers and stores. For example, an embodiment of the present invention is directed to an elastic extract transform load (ETL) extension to a strategic data transformation pipeline to support uniform content distribution to various stores as well as reactive processing. According to an exemplary illustration, data pipeline may represent a ETL toolkit based on Java Spark and Hadoop. The embodiments of the present invention may be applied to various ETL tools. Data transformations may be treated as ETL, ensuring operational and analytical stores see and act on the same data.

An embodiment of the present invention is directed to enabling real-time data processing. This supports a pivot to development of analytical applications that do not rely on storage, but use real-time cache to drive decisions.

An embodiment of the present invention supports existing and emerging data stores, while modernizing strategic Operational Data Store (ODS) platforms. For example, an embodiment of the present invention may implement a modern relational storage platform that supports concurrent online transaction processing (OLTP) and online analytical processing (OLAP) workload based on a modern SQL-compliant clustered database with roots in a file system.

In addition, an embodiment of the present invention may support business' needs while controlling costs. Much of current data cost may be driven by a plethora of data stores and in-place transformations they have to support. An embodiment of the present invention may clearly bifurcate data to Operational and Analytical stores by data retention, rather than content. This may further support aggressively pruning ODS.

An embodiment of the present invention provides a modern and nimble Foundational Data Service as opposed to a materialized model. This may involve utilizing web services-based technology, locally referred to Olympus, to build a versioned Foundational Data Service, to abstract content with NoSQL. An embodiment of the present invention may build a crowdsourced contribution model for Olympus to abstract elastic transformations as code, rather than expanding datasets. This allows for creation of on-the-fly analytical functions that are shared between machine learning (ML)/artificial intelligence (AI), analytics and business applications across Home Lending businesses. These may be centrally developed or crowd-sourced by multiple teams of software developers and analysts.

An embodiment of the present invention is directed to applying machine learning and artificial intelligence and data analytics on near real-time data sets. This enables entities to interact with customers, such as mobile users, with minimal delays. For example, while a customer is searching for property through an online real estate marketplace, an embodiment of the present invention may perform analytics that indicate which properties the customer can afford and thereby guide the customer to those types of properties.

An embodiment of the present invention is directed to minimizing data transformation (e.g., transform data only once) to support real-time data processing and modern platforms. This enables entities to build data models that create a unified view from business perspectives on top of disparate data sets.

Figure 1:
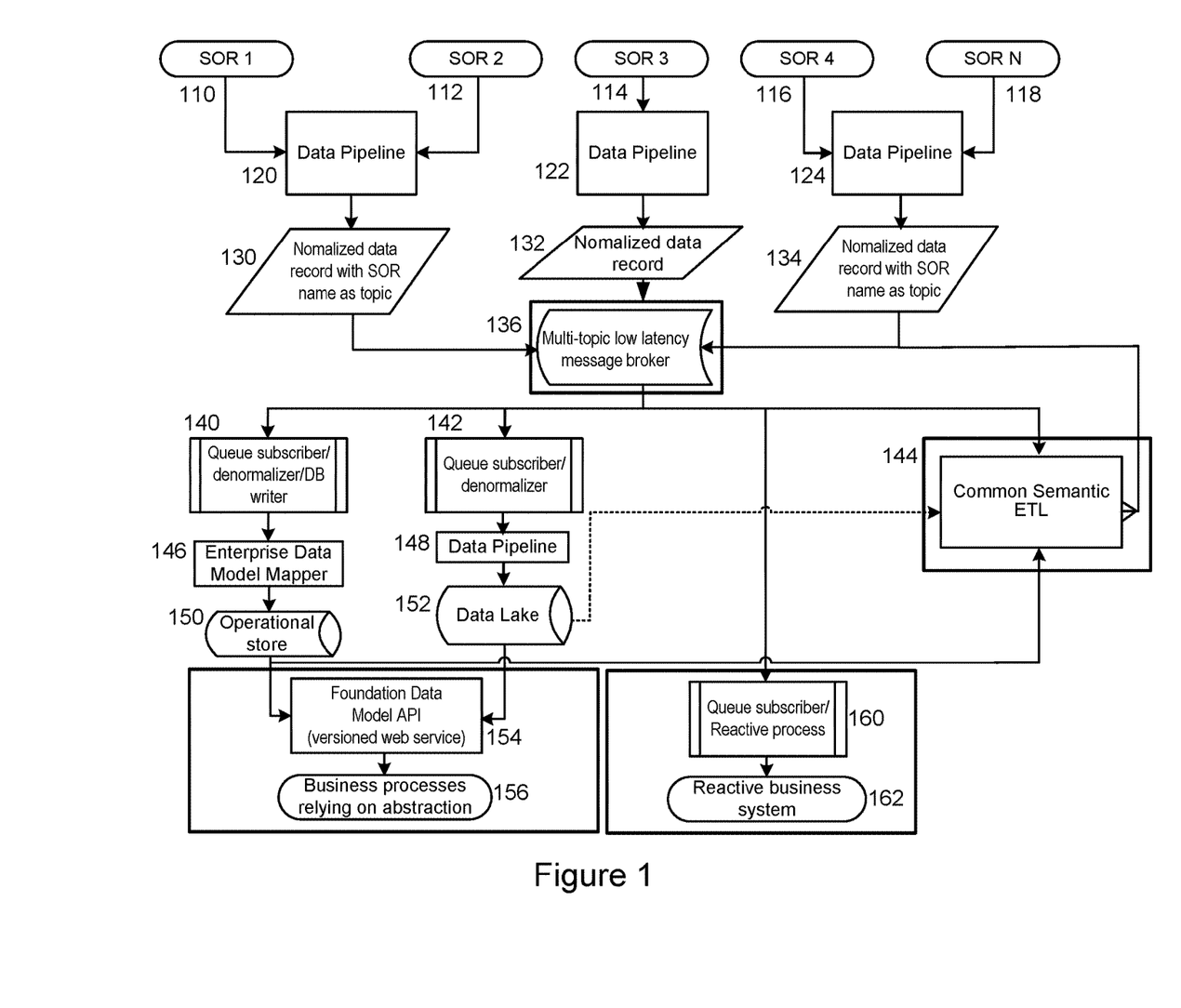
FIG. 1 is an exemplary flowchart, according to an embodiment of the present invention.

FIG. 1 is an exemplary flowchart, according to an embodiment of the present invention. System of Records (SOR) may be represented by SOR 1 (110), SOR 2 (112), SOR 3 (114), SOR 4 (116) and SOR N (118). SORs may send data to a data pipeline, represented by Data Pipeline 120, Data Pipeline 122 and Data Pipeline 124 (or Legacy ETL). Steps 130 and 134 may represent a process that normalizes data records with SOR name as topic. Step 132 may represent a process that normalizes data records.

Normalized data may be received by a multi-topic low latency message broker 136. Queue subscriber 140 may communicate with an Enterprise Data Model Mapper 146 and Operational Store 150 which supports clients who need data within a predetermined period of time, such as 72 hours. Queue 140 may also represent denormalizer and/or database writer. Queue subscriber 142 may communicate with DPL Pipeline 148 and Data Lake 152 which supports clients who need data older than a predetermined period of time, such as 72 hours.

Multi-topic low latency message broker 136 may communicate with Common Semantic ETL 144, which may become an SOR in its own right, feeding message broker 136. The message broker provides a multipoint to multipoint distribution system. The message broker also provides content-based restrictions so that certain data is accessed by subscribers with the appropriate permissions/privileges. With an embodiment of the present invention, data producers may commit files as they would source code. This may also involve automatic validation enforcement which compares messages against data registration to validate the data. Accordingly, the system may not allow the data to publish unless data registration compliance is verified. Other control and/or management functions may be implemented.

According to an exemplary illustration, multi-topic low latency message broker 136 may be represented as a message processing system, such as Advanced Message Processing System (AMPS) by 60 East Technologies. Other message processing systems or similar technologies may be realized and implemented.

Operational Store 150 and Data Lake 152 may communicate with Foundation Data Model API 154 and Business Processes relying on abstraction represented by 156.

Queue subscriber/Reactive Process 160 may support reactive business system 162. Such systems may rely on near real-time data flows to be merged from one of more SORs to implement business functions, feed analytics and/or machine learning models. Some examples may include driving real-time support of various automated and manual processes through workflow management, providing near-real-time surveillance of key data points, determining risk across loan portfolio as well as within specific divisions (e.g., branches), etc.

While the process of FIG. 1 illustrates certain steps performed in a particular order, it should be understood that the embodiments of the present invention may be practiced by adding one or more steps to the processes, omitting steps within the processes and/or altering the order in which one or more steps are performed.

An exemplary process flow may support ETL in home lending data reservoir. At 110, micro-updates are produced by the Loan Origination System (LOS). At 112, Non-LOS updates from SORs are generated regularly. At 120, data is processed in data pipeline and loaded onto the bus. At 136, once SOR data becomes available, a signal is sent to initiate transformations.

For example, an embodiment of the present invention may be applied to a business intelligence and data research environment that may be specific to home lending originations group. Data may be combined with other data sources, such as lead databases and HR information to drive data reporting and profitability by branch, manage work queues of various personnel that are aligned to aggregate business goals and to determine opportunities in the data. An embodiment of the present invention seeks to address delays in data availability that impairs utility of platforms.

At 144, running in Gaia Kubernetes Platform (GKP), which is an internal implementation of a distributed compute environment, data may be transformed making it suitable for use and reporting in near real time. Transformations may be sent back to the bus to make them available to various downstream consumers. At 160, flowing through the bus, the results of the transformation may be available to ML/AI models and decision support systems. At 140, concurrently, data is committed to a Database for reporting. At 142, same data is written to the Data Lake via the data pipeline for non-MIS consumption outside of 72 hour SLA window.

Benefits and efficiencies may be realized through the various embodiments of the present invention. Data may be located and exposed via a simple web service, or loaded after transformation into special data stores, such as SQL server, allowing analysts to focus on problem solving.

New content and semantic transformations may automatically become available in strategic stores and caches. This promotes efficiencies in data use. Analytical calculations may modify content for memorialization and may also be contributed to a shared web service for common consumption, improving time to market across the domain.

SQL Server Reporting Services (SSRS) may continue as a primary business intelligence (BI) tool with SQL server as a storage option. Other data sources may be accessed from SSRS via API connectivity or web service. Adding other BI tools, on-premise or off-premise, becomes a matter of routing pre-transformed data to another destination, should there be unique business value.

Clustered databases may be designed for scale and distributed access, with low recovery time objective (RTO). For example, similar or identical content in analytical stores allows users to keep ODS size to a minimum and abstract switching databases via API.

An embodiment of the present invention provides immediate availability of transformed content to various consumers and systems with a notification.

With an embodiment of the present invention, the same dataset may be available to consumers. This re-focuses a conversation from "where can I get data for a model" to "what data should I select for my model." As a result, analyst productivity may be improved and optimized.

An embodiment of the present invention provides improved clarity with each party committing information becoming an SOR.

Figure 2:
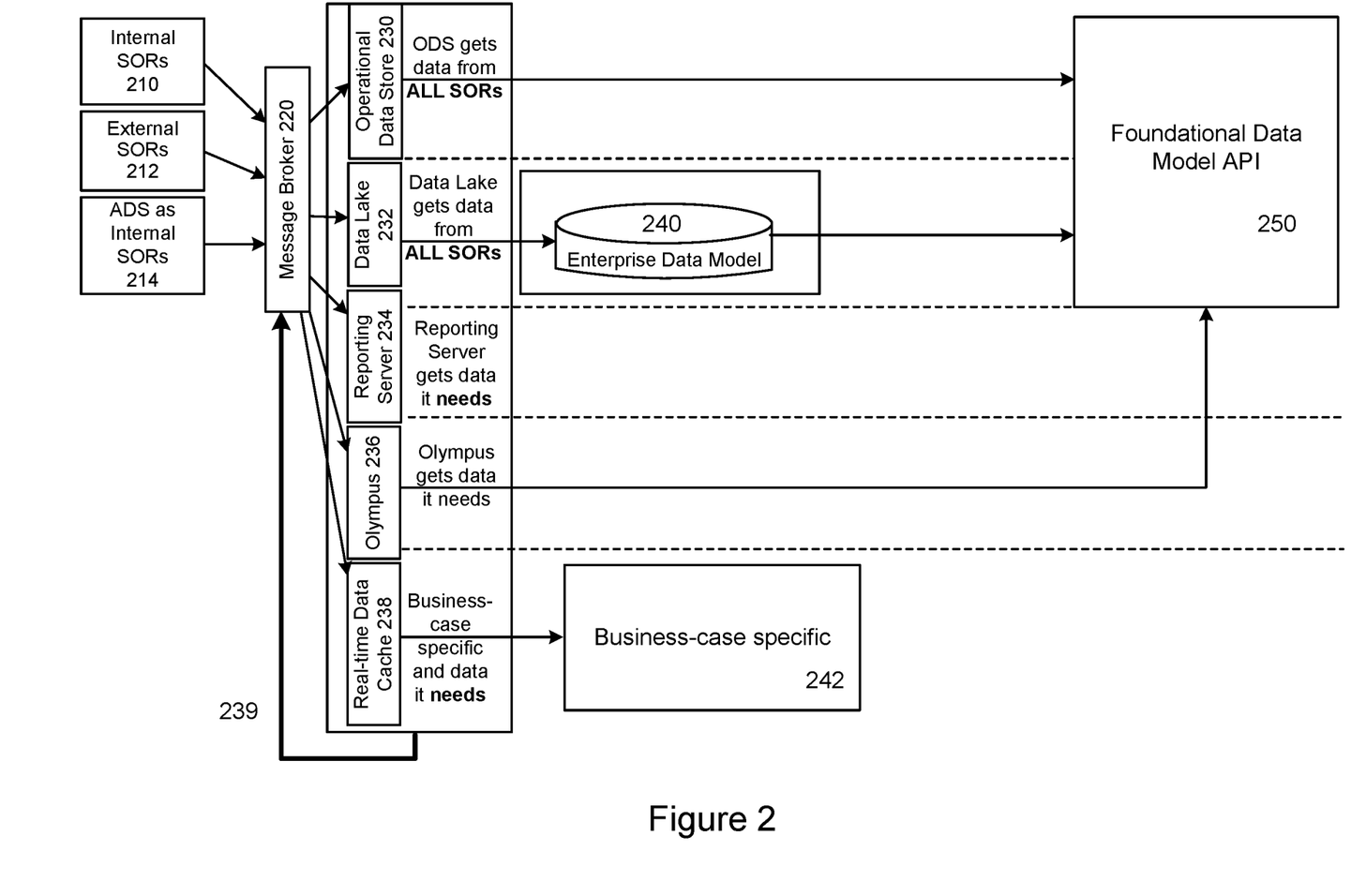
FIG. 2 is an exemplary system diagram, according to an embodiment of the present invention.

FIG. 2 is an exemplary system diagram, according to an embodiment of the present invention. FIG. 2 illustrates the impact of the HL Data Reservoir on Home Lending Architecture.

As shown in FIG. 2, system of records (SORs) may send data to a Message Broker. SORs may include Internal SORs 210, External SORs 212 and Authoritative Data Sources (ADS) as Internal SORs 214. Internal SORs 210 may include an application that supports front-end interaction with customers to capture data, e.g., Mortgage Express (MPX), which is an LOS. External SORs 212 may include an application that is hosted outside of an entity's network and sends daily extracts, e.g., Black Knight Managed Services Provider (MSP). Authoritative Data Sources (ADS) as Internal SORs 214 may include data that a HL team has transformed from applications within originations or servicing and stored to be used as an internal SOR.

As shown by FIG. 2, core platforms may ingest data from SORs. Core platforms may include Operational Data Store 230; Data Lake 232; Reporting Server 234; Olympus, which is a system that stores MSP data and makes it available to consumers using a web services protocol 236; and Real-Time Data Cache 238. Other platforms may be supported. ODS 230 may receive data from various SORs. Data Lake 232 may receive data from various SORs and stored in Enterprise Data Model 240. Reporting Server 234 may receive data it needs. Likewise, Olympus 236 may receive data it needs. Real-time data cache 238 may be business case specific and receive data it needs.

As shown by 239, data transformed becomes SOR and may be sent to the Message Broker 220. Data processing may be performed for each core platform. Data Storage for consumption may be provided. In addition, Data Access may be provided. Foundational Data Model API 250 may be provided via Olympus 236 and may access data in ODS 230 and Data Lake 232. The API provides a simple way to access information in a way that is meaningful to the business. Multiple business-case specific caches may be deployed to serve specific needs, as shown by 242. These may be added and removed as needed for cost transparency and to minimize "blast radius."

Figure 3:
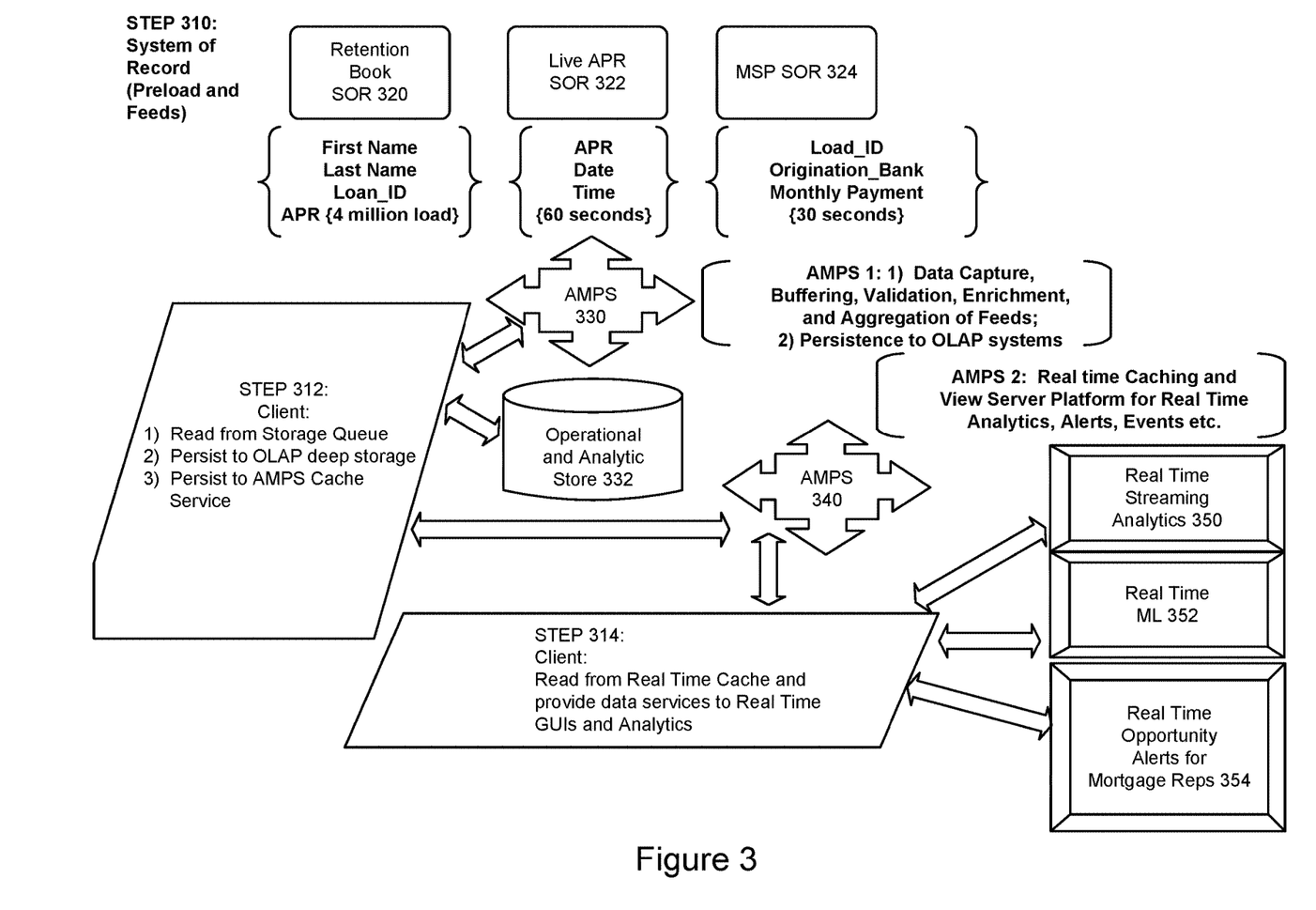
FIG. 3 is an exemplary architecture, according to an embodiment of the present invention.

FIG. 3 is an exemplary architecture, according to an embodiment of the present invention. FIG. 3 is an exemplary application relating to home lending. At step 310, system of records may preload data feeds. As shown in FIG. 3, Systems of records may include Retention Book SOR 320, Live APR SOR 322 and MSP SOR 324. Retention Book SOR 320 may manage data including First Name, Last Name, Loan_ID, and APR. Live APR SOR 322 may manage data including APR, Date, and Time. MSP SOR 324 may manage data including Loan_ID, Origination Bank, and Monthly Payment.

AMPS 330 may perform functions including (1) data capture, buffering, validation, enrichment and aggregation of feeds and (2) persistence to OLAP systems. AMPS, which stands for Advanced Message Processing System, is a commercial software component made by 60 East Technologies. AMPS is an illustrative example; other message processing systems may be implemented in accordance with various embodiments of the present invention.

At step 312, AMPS client may (1) read from storage queue, (2) persist to OLAP deep storage and (3) persist to AMPS cache service. Data storage and management may be performed by Operational and Analytic Store 332.

AMPS 340 may perform functions including real-time caching and view server platform for real time analytics, alerts, events, etc.

At step 314, AMPS client may read from real-time cache and provide data services to real-time GUIs and Analytics. Other services may include real-time streaming analytics 350, real-time machine learning 352 and real-time opportunity alerts for mortgage reps 354.

Figure 4:
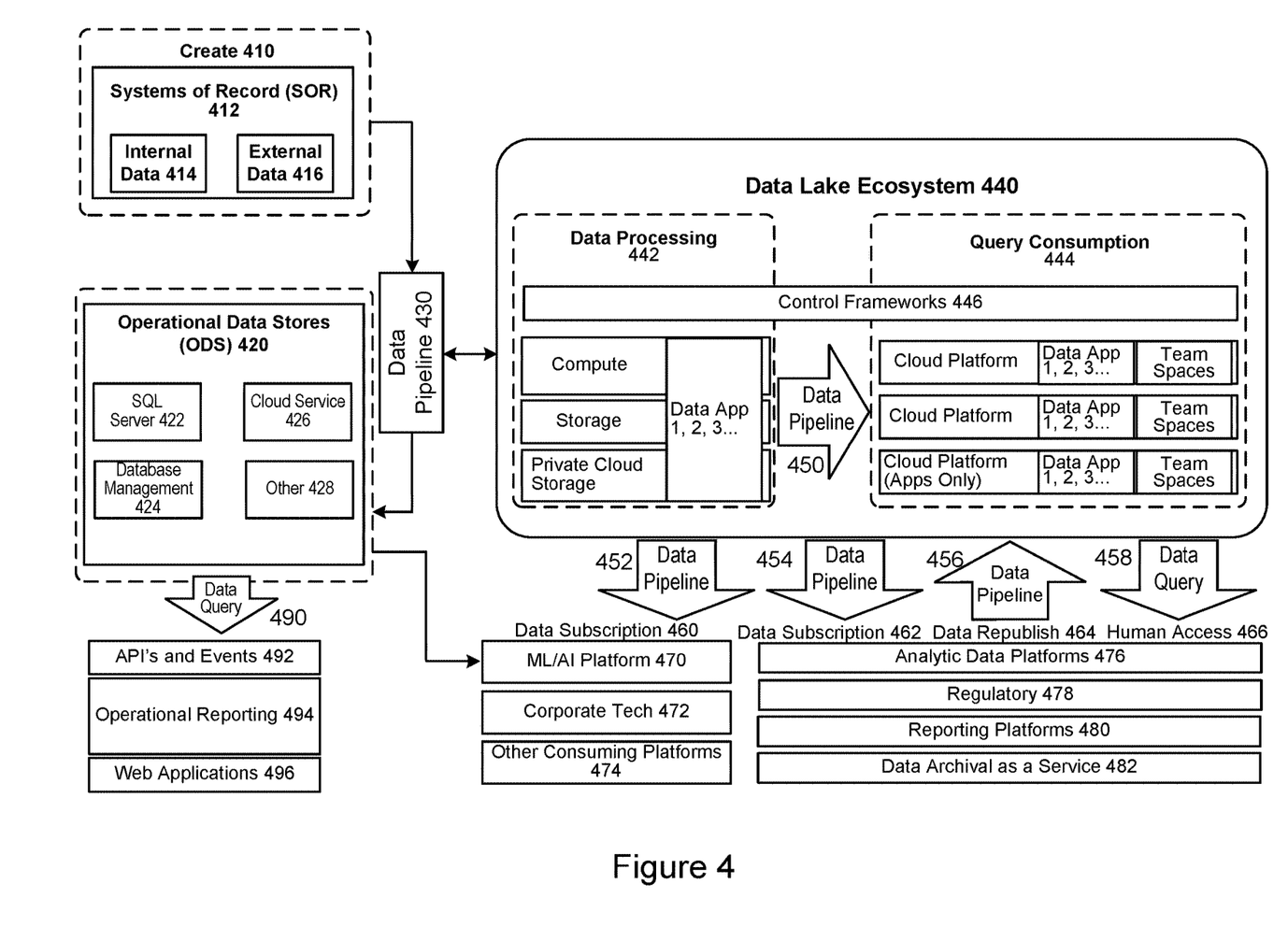
FIG. 4 is an exemplary system diagram, according to an embodiment of the present invention.

FIG. 4 is an exemplary system diagram, according to an embodiment of the present invention. FIG. 4 illustrates an enhanced data lake strategy with an operational data store (ODS) to support operational reporting.

As shown in FIG. 4, Data Lake Ecosystem 440 provides controlled access to high quality, governed, appropriately sourced data available in the form and frequency at which it is needed.

Platforms may leverage a Data Pipeline 430, 450 to move data to and from the Data Processing environment represented by 442. Human access may be provided via Query Consumption environments, represented by 444, and through Operational Data Stores 420. Control Frameworks 466 may provide access, data models, metadata, data quality, etc.

Data Pipelines 452, 454, 456, 458 may interact with Data Subscription 460, 462, Data Republish 464 and/or Human Access 466. Data Subscription 460 may include ML/AI Platform 470, corporate technology 472 and other consuming platforms 474. Additional platforms may include Analytic Data Platforms 476, Regulatory 478, Reporting Platforms 480 and Data Archival as a Service 482

Data Pipeline 430 may also interact with Systems of Records (SOR) 412 and Operational Data Stores (ODS) 420. As shown in FIG. 4, Create 410 refers to creation of information. Other sources of information may be integrated. For example, SOR 412 may represent a golden source for a piece of information and may be categorized as internal data 414 and external data 416. SOR data may be normalized and integrated to support transaction processing and operational reporting requirements. ODS 420 may support SQL Server 422, Database Management Service 424, Cloud Service 426 and other data stores 428. Data queries 490 may be submitted to APIs and Events 492, Operational Reporting 494 and Web Applications 496.

Embodiments of the present invention may realize various benefits including increased revenue; control over costs; protection from encroachment by competition; improved risk management capabilities; and improved regulatory and external reporting.

Increase in revenue may include an increase in correspondent originations flow; an increase in consumer originations flow through lead optimization and better targeting of customers with bank deposits; improved time to market for future product ideas, decreasing staffing churn across business cycles as a side benefit; and improved ML/AI capabilities and reduced friction to adoption.

Control in costs may include rationalize cost of data and flatten growth curve, if not required for strategic growth; consolidated data stores; migration from Legacy ETL to data pipeline. It may also include reduction in cost of originating and/or managing a loan through higher degree of automation or better personnel efficiencies, etc.

Protection of franchise from encroachment by new competition may be realized through an increase in speed of innovation. This may involve rapid analysis of usage and sentiment data and correlation to loan activities.

Improved risk management capabilities may involve protecting an entity against the next crisis, rather than the last one. For example, a decrease in speed of data access to facilitate intraday risk reporting may be realized.

Improved Regulatory and External reporting may further simplify access to underlying data (sometimes hidden by semantic transformations) and also decrease data retrieval times though better support for standards including Mortgage Industry Standards Maintenance Organization (MISMO) standard.

An embodiment of the present invention is directed to elastic data transformation with consistent data model. Transformation may support a new class of client applications, which would no longer need to rely on databases to operate, such as reactive data models, interactive predictive analytics, real-time risk and P&L calculators, etc. Real-time services may act as SORs as well, thus they could start chipping away at human-intensive tasks by targeting individual sub-tasks in workflows, such as in the area of underwriting. With all new content available on a shared Pub/Sub bus, new data stores and processors may be added with little to no upheaval cost. This provides an ability to add innovative technologies that a business has started to adopt. In addition, a single data pipeline may allow near real-time distribution of information to approved off-site destinations. While ETL may be modified to adopt data pipeline model, future changes to downstream data sources may be decoupled from the transformation logic.

An embodiment of the present invention is directed to operational versus analytical store rationalization. For example, same tools may work on both ODS and analytical stores, with a simple decision tree for picking the right database. Cost modeling of data preservation and application design may be greatly simplified. Since some RDBMS platforms do not support stored procedures, there will be an adoption cost. But this may be mitigated by long-term savings and future innovation, as stored procedures usually create significant lock-in with DB platforms. In addition, new-age database platforms also allow reads to hit multiple clusters, potentially significantly speeding up client operations. This may be especially relevant in long-haul communications. Reduction in schema complexity may aid AI/ML model testing, which needs access to as much information as possible in order to assess benefits of different models.

An embodiment of the present invention is directed to implementing a foundation data service as a web service API, such as REST. While adding a layer to a support model for some two-tier apps, an embodiment of the present invention may realize various advantages and benefits. An embodiment of the present invention may decouple end users from specific data stores, creating an abstraction layer that allows for future innovation in the storage arena. Once end users are not making direct database connections, there is an ability to innovate freely in both content and storage arenas, which may be hidden from users by the service. RESTFul APIs may be versioned, allowing the model to evolve without impacting legacy consumers on every iteration. Proliferation of unmanaged reports that has been highlighted as a risk may be mitigated by creating a crowdsourcing model of contributions of features to the new data model. This model may also improve data quality and controls.

Service may be extended to include analytical functions, even eliminating certain sematic data fields. Since HL business users are not clustered in a geographic region, the service may be geographically dispersed to match data storage. This may improve performance while widening maintenance windows. For example, MISMO standard extracts may be built into the Service to facilitate reporting from any client tool. Further, privileged access may be implemented inside the Service, which may exceed capabilities of underlying RDMS.

An embodiment of the present invention is directed to cloud-friendly technology. Elasticity of compute in Public Clouds may be very cost-advantageous for various types of workloads. In addition, scaling compute down during the off-hours may produce significant savings. By using product-neutral elastic data pipeline, destinations may be set up for transformed data at Public Cloud providers. In addition, data may be sent to multiple Clouds concurrently to benefit from vendor-specific tools and cost models. With movement of information no longer encumbered, home lending and other businesses may tap into any provider or technology to host transaction data, supporting cross-domain analytics and AI/ML models by a preferred technology provider.

Figure 5:
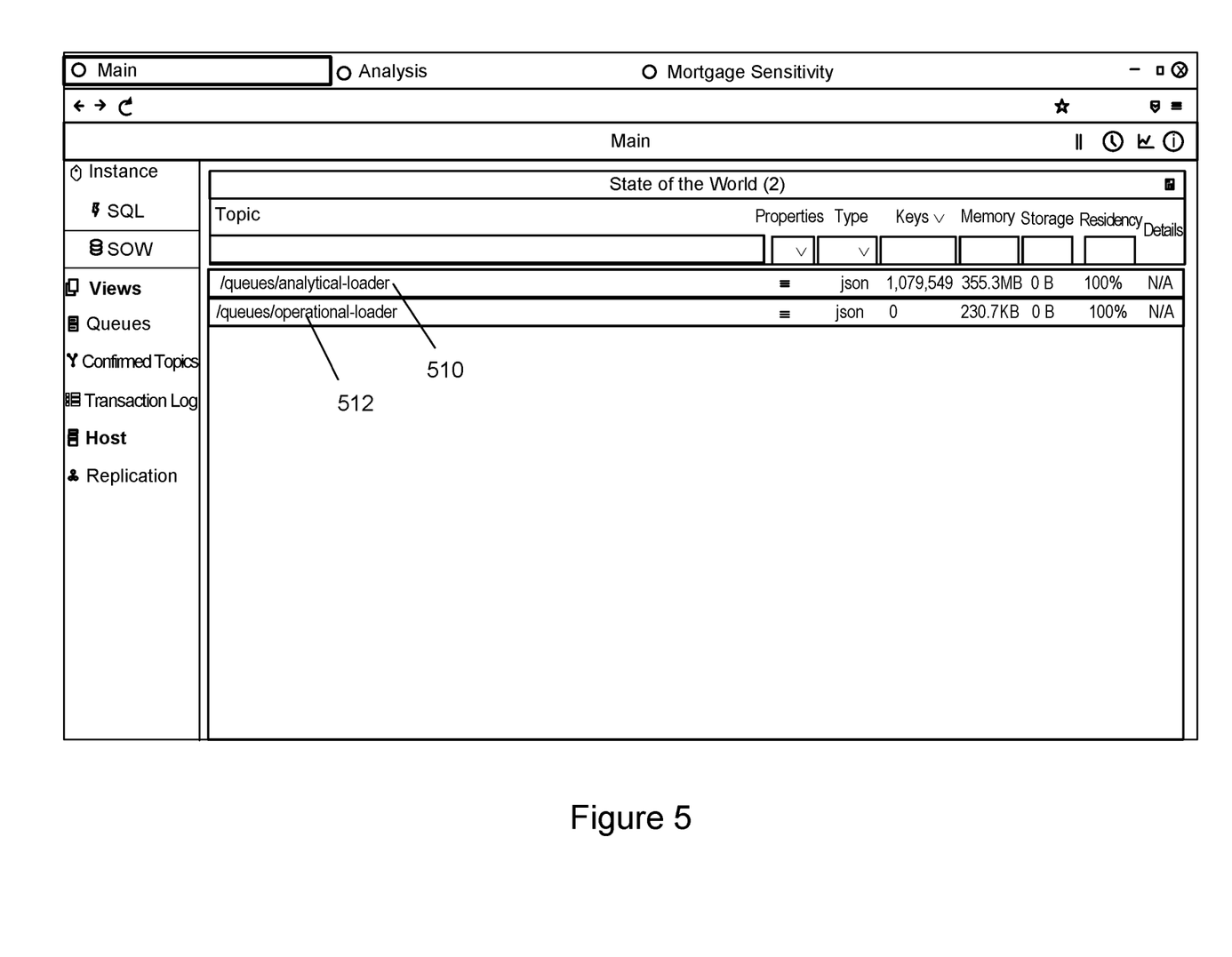
FIG. 5 is an exemplary user interface, according to an embodiment of the present invention.

FIG. 5 is an exemplary user interface, according to an embodiment of the present invention. FIG. 5 illustrates two topics, an analytical loader 510 and an operational loader 512. Additional details may include Properties; Type; Keys; Memory; Storage; and Residency.

FIG. 5 illustrates two analytical queues that guarantee data delivery to destinations. In this example, data may be delivered in order by topic where load identifier is the topic name. An embodiment of the present invention makes sure that all the information for that loan arrives in order. FIG. 5 illustrates two guaranteed delivery queues. Day-to-day business operations and business intelligence may run on top of these data sets. Analytical load sends data to data lakes for consumption by the general organization.

Figure 6:
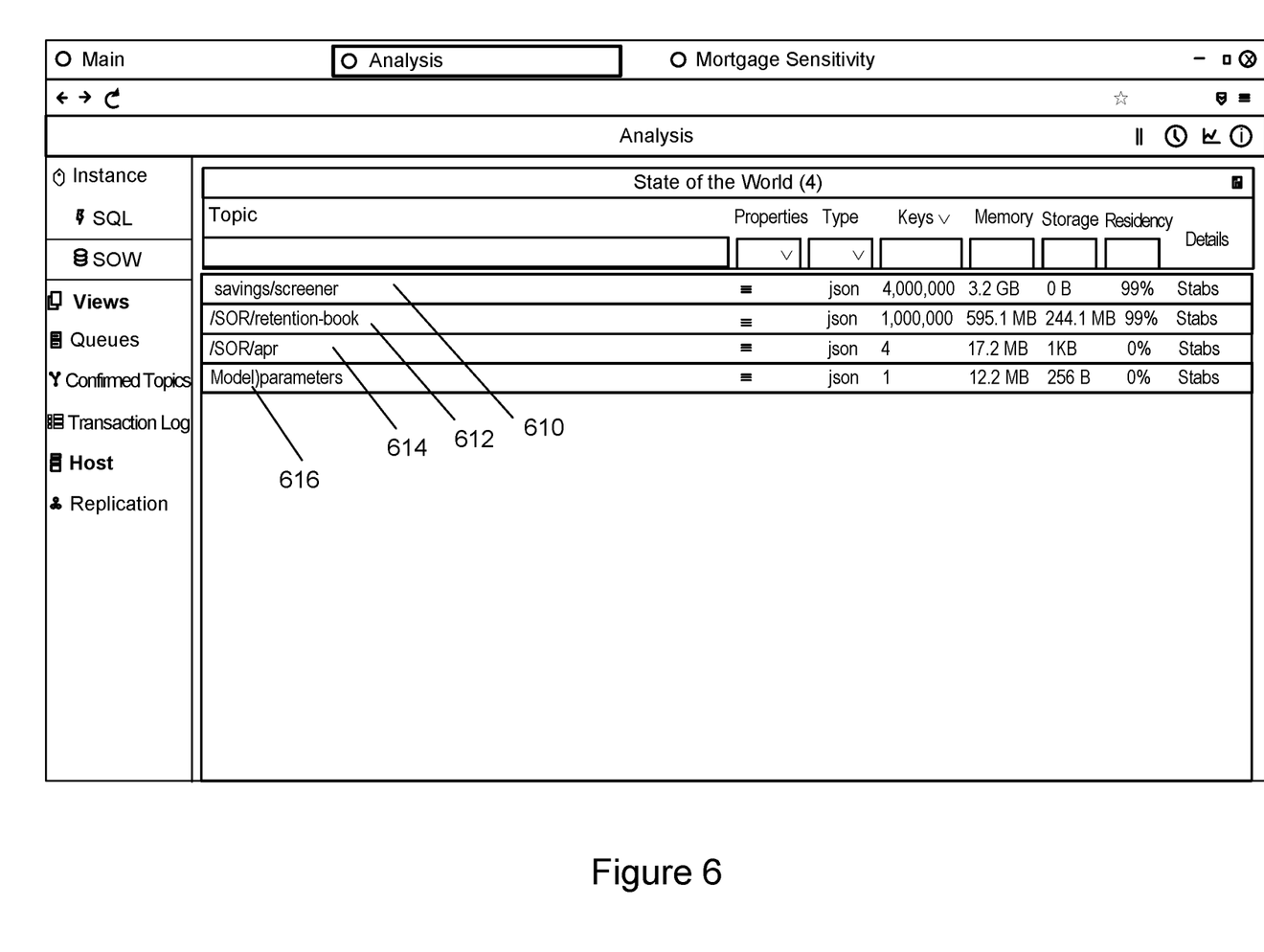
FIG. 6 is an exemplary user interface, according to an embodiment of the present invention.

FIG. 6 is an exemplary user interface, according to an embodiment of the present invention. FIG. 6 illustrates topics including a savings screener 610, retention book 612, APR 614 and model parameters 616. Additional details may include Properties; Type; Keys; Memory; Storage; Residency.

Figure 7:
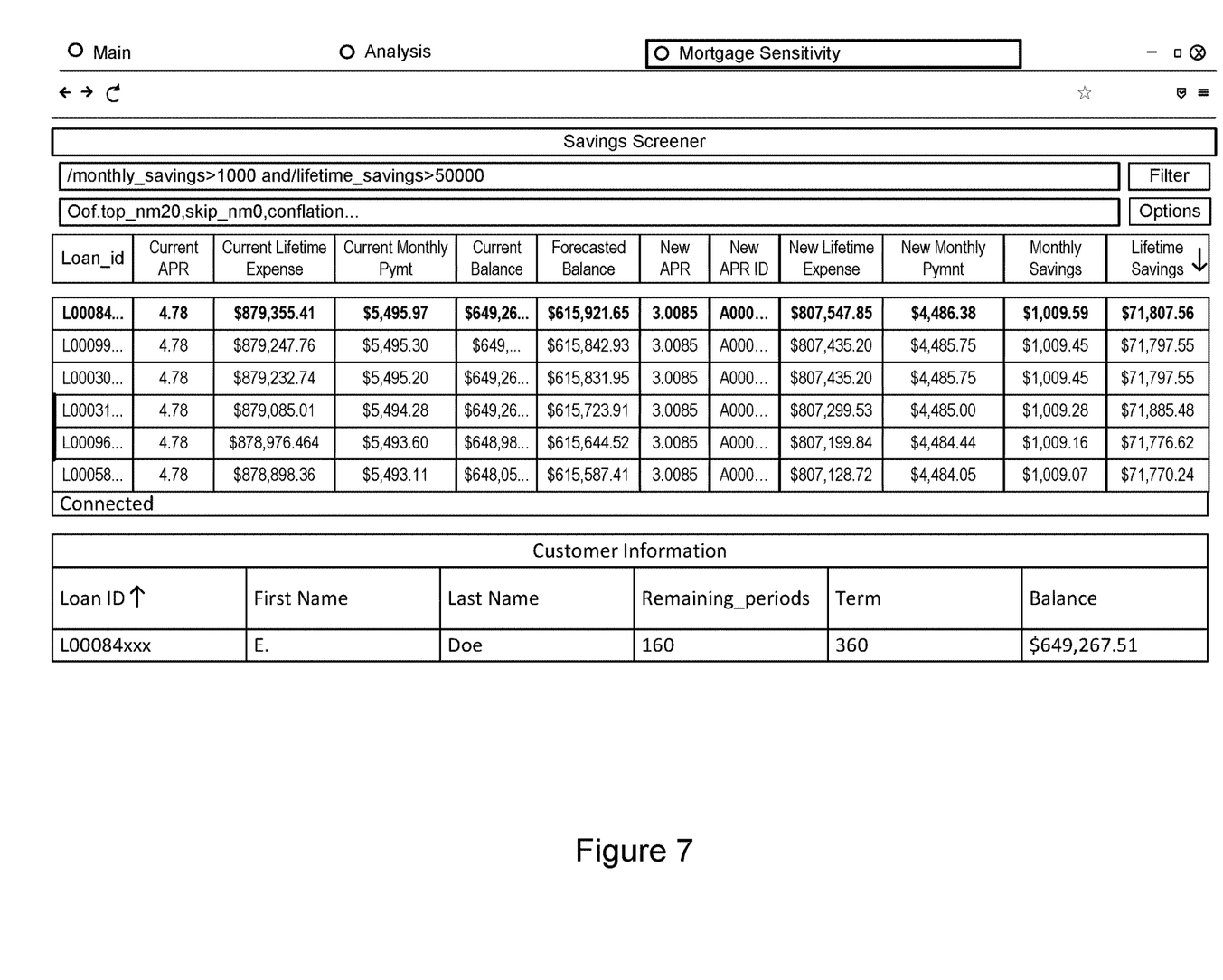
FIG. 7 is an exemplary user interface, according to an embodiment of the present invention.

FIG. 7 is an exemplary user interface, according to an embodiment of the present invention. FIG. 7 illustrates a detailed view of Savings Screener. FIG. 7 provides details including loan identifier, current APR, current lifetime expense, current monthly payment, current balance, forecasted balance, new APR, new APR identifier, new lifetime expense, new monthly payment, monthly savings and lifetime savings. Customer information may include loan identifier, first name, last name, remaining periods, term, and balance.

According to an exemplary illustration, an embodiment of the present invention may assess sensitivity to changes in interest rates. In this example, systems of records may communicate mortgage data with an analytical cache. The mortgage data may include the borrower, principal amount, how many outstanding payments are left and current interest rate—most of which do not change. APR rates, however, do change. As APR rates change, corresponding data changes on the fly. This may be shown by FIG. 7, for example.

An embodiment of the present invention recognizes that the leading indicator that changes multiple times a second is the 10 year treasury yield. An embodiment of the present invention may identify trends and apply automations to trigger a process to start collecting information about a customer that breached an early threshold. The system may then pre-create an application on the customer's behalf and inform the customer of a new interest rate that will be published soon. The customer may then be prompted to click a submit button to take advantage of the new rate.

An embodiment of the present invention provides a deeper level of customer engagement through a richer data set. Data from various data sources may be introduced, including appraisal values, market data; county records, foreclosures, etc.

FIG. 7 illustrates a forecasted balance column that tracks a current balance closely. Current balance may be calculated based on factors in a mortgage book. Forecasted balance may be the result of a machine learning linear regression on an entire data set. A formula may pick two input parameters from a mortgage book and multiply it by a measure of coefficients. With an embodiment of the present invention, a user may change a coefficient and then recalculate the forecasted balance.

An embodiment of the present invention is directed to a retraining process that may be executed on a daily or other frequent basis. An embodiment of the present invention may then programmatically check whether tolerances are permitting new findings of the model and then automatically publish the result of the model as data into the system. This may be automatically reflected all the way to the destination system-whether customer facing, adviser facing or other interface.

An embodiment of the present invention may be supported by an entity, such as a financial institution, organization, etc. Users may interact via various communication networks. Users may represent users in the financial environment as well as other users that rely on real-time data.

The system of an embodiment of the present invention may be implemented in a variety of ways. Architecture may be implemented as hardware components (e.g., module) within one or more network elements. It should also be appreciated that architecture may be implemented in computer executable software (e.g., on a tangible, non-transitory computer-readable medium) located within one or more network elements. Module functionality of architecture within the system may be located on a single device or distributed across a plurality of devices including one or more centralized servers and one or more mobile units or end user devices.

Communication networks may include a wireless network, a wired network or any combination of wireless network and wired network. For example, communication networks may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, communication networks may support an Internet network, a wireless communication network, a cellular network, Bluetooth, or the like, or any combination thereof. Communication networks may further include one, or any number of the exemplary types of networks mentioned above operating as a stand-alone network or in cooperation with each other. Communication networks may utilize one or more protocols of one or more network elements to which it is communicatively coupled. Communication networks may translate to or from other protocols to one or more protocols of network devices. Communication networks may comprise a plurality of interconnected networks, such as, for example, a service provider network, the Internet, a cellular network, corporate networks, or even home networks, or any of the types of networks mentioned above.

Data may be transmitted and received via communication networks utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example.

Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a home lending data reservoir, the system comprising:
   at least one server; and
   at least one memory including a set of instructions that, when executed by the at least one server, causes the at least one server to function as:
   a multi-topic low latency message broker that receives normalized data records from a plurality of systems of record (SORs);
   a common semantic extract transform load (ETL) module that transforms data from the normalized data records, received from the multi-topic low latency message broker, and that makes transformed data suitable for use and reporting in near real-time, the common semantic ETL module sending the transformed data back to the multi-topic low latency message broker;

a first queue subscriber that communicates with a business system for machine learning and artificial intelligence models and one or more decision support systems, the first queue subscriber receiving the transformed data from the multi-topic low latency message broker, which is sent back to the multi-topic low latency message broker from the common semantic ETL module;

a second queue subscriber that communicates with an operational store wherein the operational store provides data within a predetermined period of time, the second queue subscriber receiving the transformed data from the multi-topic low latency message broker concurrently with the first queue subscriber; and a third queue subscriber that communicates with a data lake through a data pipeline wherein the data lake provides data older than the predetermined period of time, the third queue subscriber receiving the transformed data from the multi-topic low latency message broker outside the predetermined period of time, wherein the multi-topic low latency message broker provides content-based restrictions so that access to certain data requires at least one of permission or privilege, and the multi-topic low latency message broker compares the normalized data records against data registration for validation, and only allows data to publish in response to data registration compliance being verified.

2. The system of claim 1, where the plurality of SORs send data to one or more data pipelines.

3. The system of claim 2, where at least one of the data pipelines represents a legacy ETL.

4. The system of claim 1, wherein the second queue subscriber further communicates using an enterprise data model mapper with the operational store.

5. The system of claim 1, wherein a foundational data model application programming interface (API) communicates with business processes relying on abstraction.

6. The system of claim 1, wherein a foundational data model application programming interface (API) receives data from the operational store and/or the data lake.

7. The system of claim 1, wherein the multi-topic low latency message broker provides the content-based restrictions based on the at least one of the permission or privilege.

8. The system of claim 7, wherein the multi-topic low latency message broker further provides automatic validation enforcement that compares one or more messages against data registration to validate data.

9. The system of claim 1, wherein the multi-topic low latency message broker communicates with a reporting server and real-time data cache.

10. The system of claim 1, wherein the plurality of SORs comprises internal SORs, external SORs and authoritative data sources (ADS) as internal SORs.

11. A method that implements a home lending data reservoir system, the method comprising:

receiving, via a multi-topic low latency message broker, normalized data records from a plurality of systems of record (SORs);

providing, via the multi-topic low latency message broker, content-based restrictions so that access to certain data requires at least one of permission or privilege;

comparing, via the multi-topic low latency message broker, the normalized data records against data registration for validation, and only allowing data to publish in response to data registration compliance being verified;

transforming, via a common semantic extract transform load (ETL) module, data from the normalized data records and makes transformed data suitable for use and reporting in near real-time, the transformed data being sent back to the multi-topic low latency message broker from the common semantic ETL module;

communicating, via a first queue subscriber, with a business system for machine learning and artificial intelligence models and one or more decision support systems, the transformed data sent from the common semantic ETL module being communicated with the business system;

communicating, via a second queue subscriber, with an operational store wherein the operational store provides data within a predetermined period of time, the transformed data sent from the common semantic ETL being concurrently communicated with the operational store; and communicating, via a third queue subscriber, with a data lake through a data pipeline wherein the data lake provides data older than the predetermined period of time, the transformed data sent from the common semantic ETL being communicated with the data lake outside the predetermined period of time.

12. The method of claim 11, where the plurality of SORs send data to one or more data pipelines.

13. The method of claim 12, where at least one of the data pipelines represents a legacy ETL.

14. The method of claim 11, wherein the second queue subscriber further communicates using an enterprise data model mapper with the operational store.

15. The method of claim 11, wherein a foundational data model application programming interface (API) communicates with business processes relying on abstraction.

16. The method of claim 11, wherein a foundational data model application programming interface (API) receives data from the operational store and/or the data lake.

17. The method of claim 11, wherein the multi-topic low latency message broker provides the content-based restrictions based on the at least one of the permission or privilege.

18. The method of claim 17, wherein the multi-topic low latency message broker further provides automatic validation enforcement that compares one or more messages against data registration to validate data.

19. The method of claim 11, wherein the multi-topic low latency message broker communicates with a reporting server and real-time data cache.

20. The method of claim 11, wherein the plurality of SORs comprises internal SORs, external SORs and authoritative data sources (ADS) as internal SORs.

* * * * *